United States Patent
Kamiyama et al.

(10) Patent No.: US 7,322,382 B2
(45) Date of Patent: Jan. 29, 2008

(54) SEGMENT FOR A REHABILITATING PIPE

(75) Inventors: Takao Kamiyama, Hiratsuka (JP); Koji Kaneta, Hiratsuka (JP); Kenji Fujii, Hiratsuka (JP); Makoto Ishida, Hiratsuka (JP)

(73) Assignee: Shonan Gosei-Jushi Seisakusho K.K. (JP)

( * ) Notice: Subject to any disclaimer, the term of this patent is extended or adjusted under 35 U.S.C. 154(b) by 186 days.

(21) Appl. No.: 11/063,473

(22) Filed: Feb. 22, 2005

(65) Prior Publication Data

US 2006/0001258 A1 Jan. 5, 2006

(30) Foreign Application Priority Data

Apr. 7, 2004 (JP) .............................. 2004-112637

(51) Int. Cl.
*F16L 9/22* (2006.01)

(52) U.S. Cl. ...................... 138/162; 138/155; 138/160; 285/15

(58) Field of Classification Search ................ 285/12, 285/15, 16, 17, 411, 412, 419, 373; 138/155, 138/157, 162, 159, 160
See application file for complete search history.

(56) References Cited

U.S. PATENT DOCUMENTS

| | | | | | |
|---|---|---|---|---|---|
| 1,211,784 | A | * | 1/1917 | Stuart | 285/16 |
| 1,225,867 | A | * | 5/1917 | Schumacher | 285/332 |
| 1,329,522 | A | * | 2/1920 | Griffin | 285/16 |
| 1,331,986 | A | * | 2/1920 | Griffin | 285/16 |
| 1,331,987 | A | * | 2/1920 | Griffin | 285/16 |
| 1,331,988 | A | * | 2/1920 | Griffin | 285/16 |
| 1,668,855 | A | * | 5/1928 | Ludlum | 285/16 |
| 3,708,187 | A | * | 1/1973 | Campbell | 285/373 |
| 4,105,051 | A | * | 8/1978 | Visentin | 138/162 |
| 4,130,300 | A | * | 12/1978 | Sheridan | 285/16 |
| 4,199,175 | A | * | 4/1980 | Paukune | 285/405 |
| 4,429,907 | A | * | 2/1984 | Timmons | 285/373 |

\* cited by examiner

*Primary Examiner*—David Bochna
(74) *Attorney, Agent, or Firm*—Adams & Wilks

(57) ABSTRACT

A segment for a rehabilitating pipe is coupled to another segment in the circumferential and longitudinal directions of a rehabilitating pipe to rehabilitate an existing pipe. The segment has on one coupling surface a protruding part and a recessed part continuous with the protruding part and on another coupling surface a recessed part and a protruding part whose shapes respectively conform to the protruding part and the recessed part of one coupling surface. The protruding part and the recessed part of one coupling surface of one segment is brought into tight surface contact with the recessed part and protruding part of another coupling surface of another segment and interfitted thereto when one and another segments are mutually coupled in the circumferential and longitudinal directions of the rehabilitating pipe.

11 Claims, 14 Drawing Sheets

SEGMENT FOR A REHABILITATING PIPE

BACKGROUND OF THE INVENTION

1. Field of the Invention

The present invention relates to a segment adapted for use for a rehabilitating pipe that is assembled to rehabilitate an existing pipe, such as a sewer pipe.

2. Description of the Prior Art

A method of rehabilitating an existing pipe is known from Japanese Patent Laid Open Publication No. 2003-214098 and the like, wherein a compound pipe is constructed to rehabilitate an existing pipe like a sewer pipe by, as shown in FIG. 11, assembling inside an existing pipe 4 a rehabilitating pipe 3 whose outer diameter is slightly less than the inner diameter of the existing pipe 4, and then filling and hardening a filler (not shown) in the gap between the outer periphery of the rehabilitating pipe 3 and the inside wall surface of the existing pipe 4. The rehabilitating pipe 3 is assembled using segments. Namely, as shown in FIG. 12, the rehabilitating pipe 3 is assembled by an assembly worker S who couples inside a manhole 5 in communication with the existing pipe 4 the arcuate segments 1 in the circumferential direction thereof (the circumferential direction of the rehabilitating pipe 3) to assemble a short, ring-shaped pipe unit 2 and then mutually coupling the pipe units 2 inside the existing pipe in the longitudinal direction of the pipe units 2 (the longitudinal direction of the rehabilitating pipe 3).

FIG. 13 shows a cross-section taken along the width direction (the longitudinal direction of the rehabilitating pipe) of a conventional segment 1. In FIG. 13, side plates 202 and 203 are provided upright on both sides in the width direction of an inner plate 201, whose bottom surface forms an inner circumferential surface of the rehabilitating pipe. V-shaped protruding parts 202a and rectangular recessed parts 203a are formed at two locations of an outer surface of the side plates, extending in the circumferential direction of the rehabilitating pipe. The segments 1 are coupled in the longitudinal direction of the rehabilitating pipe as shown in FIG. 14 by mutually coupling the pipe units 2; at that time, a sealing material (not shown) is coated inside the recessed parts 203a of the side plate 203 of one of the segments 1, and the protruding parts 202a of the side plate 202 of another of the segments 1 is fitted into those recessed parts 203a, and the outer surfaces of the side plate s202 and 203 are thereby mutually coupled so that their coupling surfaces make tight contact. Such a structure obtains watertightness in the coupling part of the rehabilitating pipe in the longitudinal direction. Furthermore, a similar structure obtains watertightness in the coupling part of the segments in the circumferential direction of the rehabilitating pipe.

Nevertheless, in the structure of the conventional segment 1 as described above, there is a problem in that watertightness can sometimes not be ensured in the coupling part because, in the state wherein the segments 1 are mutually coupled by fitting the protruding parts 202a to the recessed parts 203a as described above, the vertex part of the V shape of the protruding parts 202a only make line contact with the back flat surface of the recessed part 203a, and gaps occur between them due to the small contact surface between them.

It is therefore an object of the invention to provide a rehabilitating pipe segment that can improve the water tightness in the coupling part of mutually coupled segments.

SUMMARY OF THE INVENTION

A segment for a rehabilitating pipe according to the invention is coupled to another segment in the longitudinal direction of a rehabilitating pipe to rehabilitate an existing pipe. The segment has on one coupling surface in the longitudinal direction a protruding part and a recessed part continuous with said protruding part and on another coupling surface in the longitudinal direction a recessed part and a protruding part whose shapes respectively conform to said protruding part and said recessed part of said one coupling surface. The protruding part and the recessed part of said one coupling surface of one segment is brought into tight surface contact with the recessed part and protruding part of said another coupling surface of another segment and interfitted thereto when said one and another segments are mutually coupled in the longitudinal direction of the rehabilitating pipe.

In addition, a segment for a rehabilitating pipe according to the invention is coupled to another segment in the circumferential direction of a rehabilitating pipe to rehabilitate an existing pipe. The segment has on one coupling surface in the circumferential direction a protruding part and a recessed part continuous with said protruding part and on another coupling surface in the circumferential direction a recessed part and a protruding part whose shapes respectively conform to said protruding part and said recessed part on said one coupling surface. The protruding part and the recessed part of said one coupling surface of one segment is brought into tight surface contact with the recessed part and protruding part of another coupling surface of another segment and interfitted thereto when said one and another segments are mutually coupled in the circumferential direction of the rehabilitating pipe.

The structure of the present invention improves the watertightness in the coupling surfaces in the longitudinal direction of the rehabilitating pipe and can ensure sufficient watertightness because, when mutually coupling the segments in the longitudinal direction of the rehabilitating pipe, the protruding part and the recessed part of one of the coupling surfaces of one of the segments in the longitudinal direction is brought into tight surface contact and can be interfitted with the recessed part and the protruding part of another coupling surface of another of the segments, and because the joint is strengthened by the locally enlarged surface area due to the intricate, continuous shapes of the protruding parts and the recessed parts. In addition, excellent effects are also obtained, for the same reasons, with the coupling in the circumferential direction, wherein watertightness is improved in the coupling surfaces in the circumferential direction, and sufficient water tightness can be ensured.

Further features of the invention, its nature and various advantages will be more apparent from the accompanying drawings and following detailed description of the invention.

DESCRIPTION OF THE PREFERRED EMBODIMENTS

Figure 1:
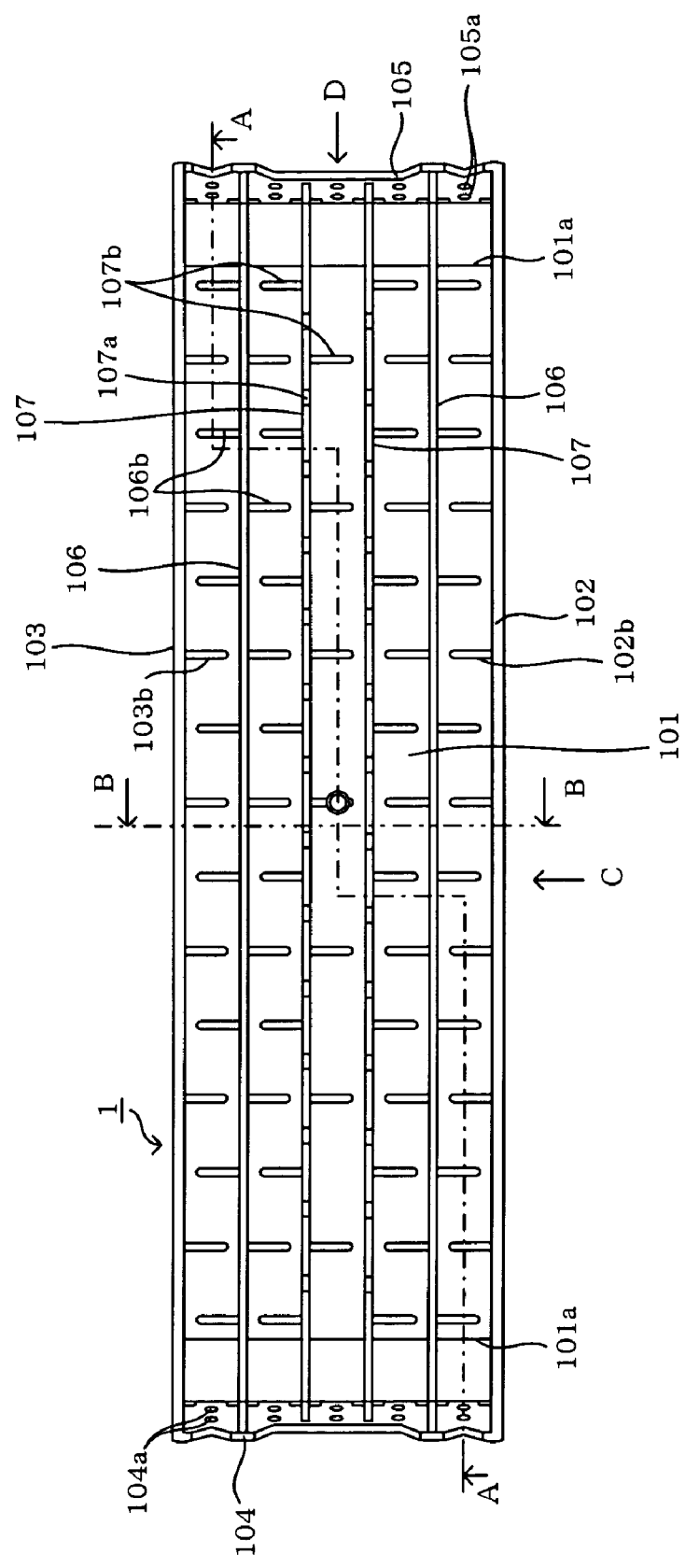
FIG. 1 is a top view that depicts the structure of a rehabilitating pipe segment of an embodiment according to the present invention.

The invention will be described based on embodiments, referring to the drawings. To rehabilitate the existing pipe, such as a sewer pipe, segments are used to assemble a circular, ring-shaped pipe unit 2. One segment corresponds to one piece of the pipe unit 2 when it is divided for segmentation into a plurality of equal parts in the circumferential direction, e.g., five equal parts. The pipe unit 2 is assembled by coupling a plurality of segments 1 in the circumferential direction of the rehabilitating pipe 3, and these are successively coupled in the longitudinal direction to assemble the rehabilitating pipe 3.

Figure 2:
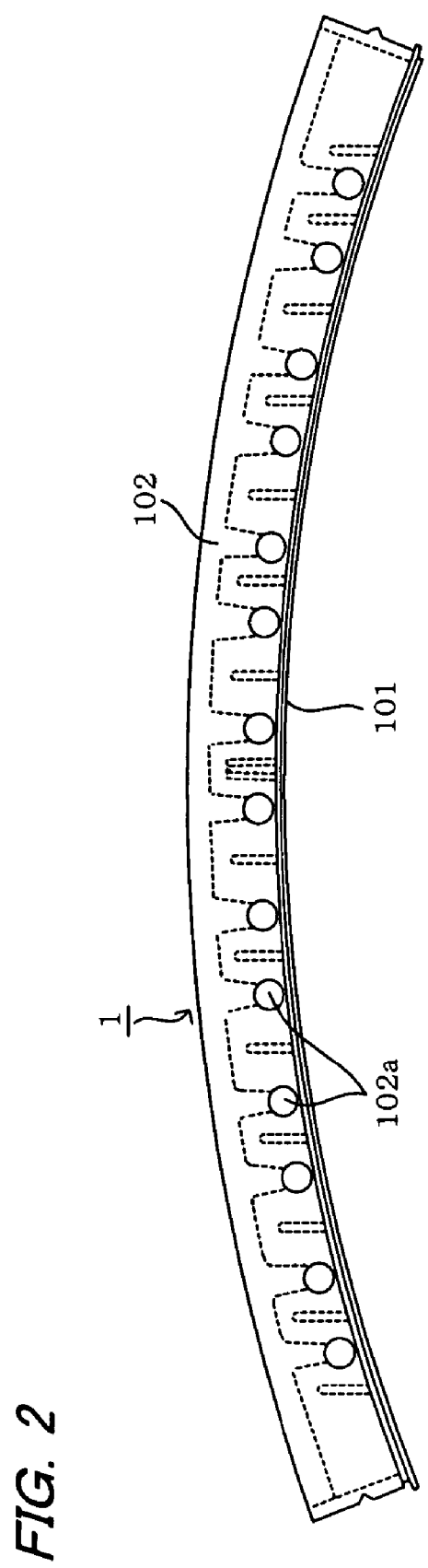
FIG. 2 is a side view shown from the arrow C direction in FIG. 1.
Figure 3:
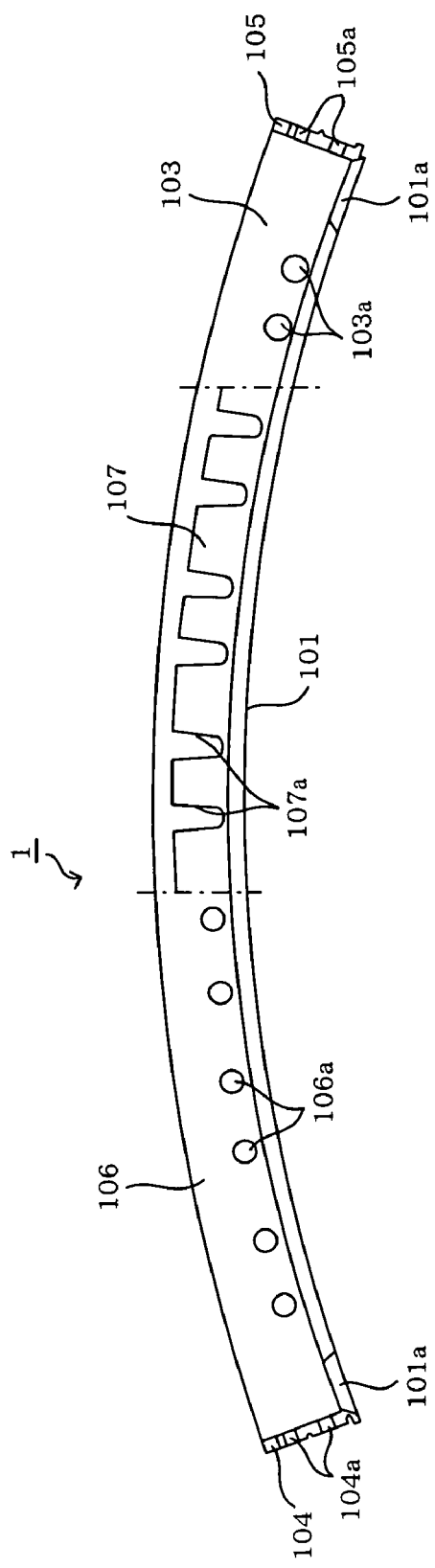
FIG. 3 is a cross-sectional view taken along the A-A line in FIG. 1.
Figure 4:
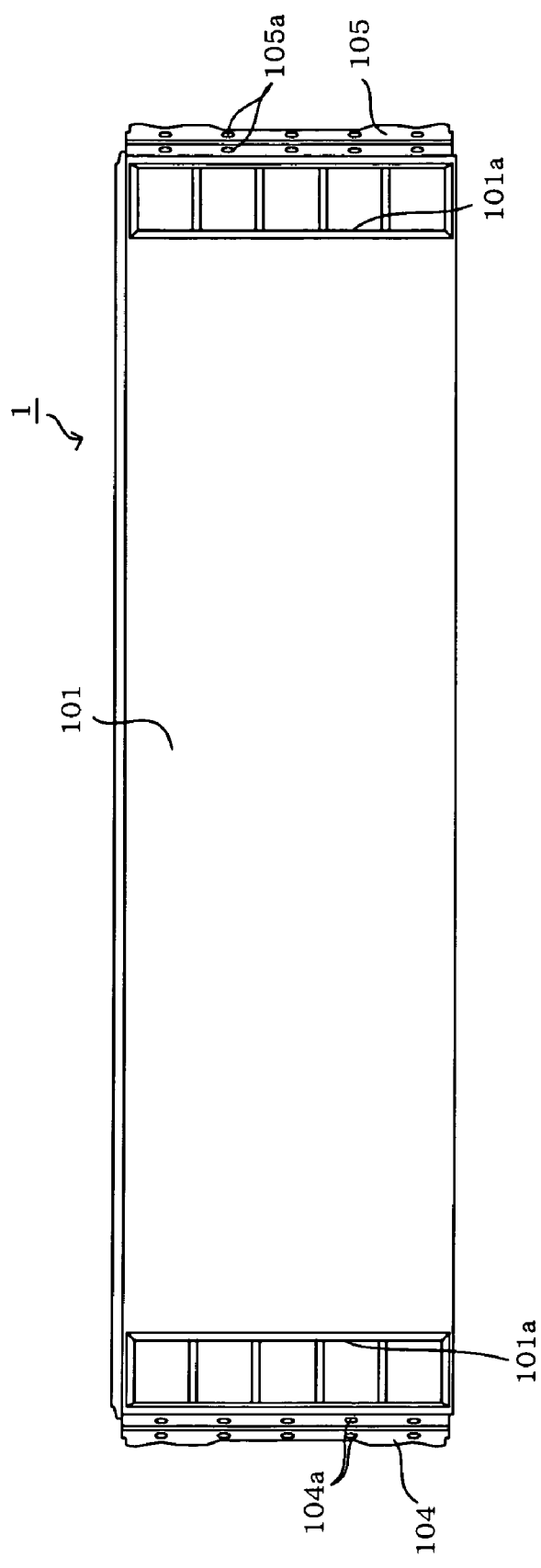
FIG. 4 is a bottom view of the segment.
Figure 5:
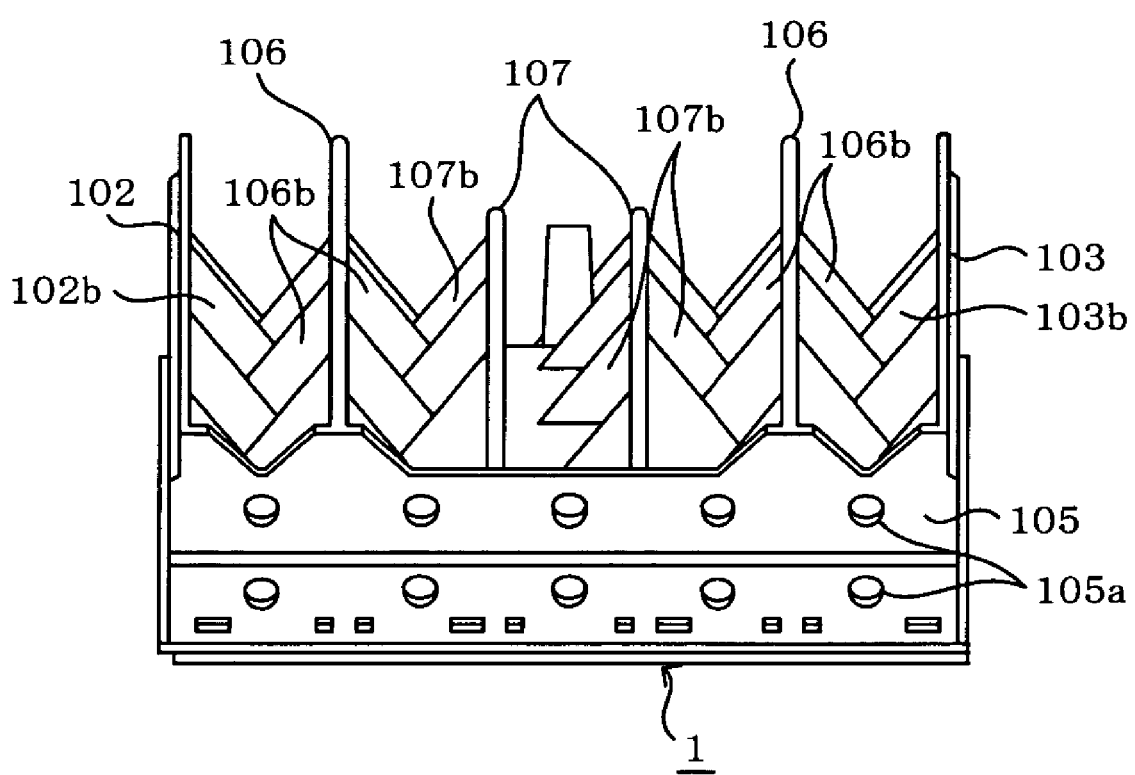
FIG. 5 is an auxiliary view in the arrow D direction of FIG. 1.
Figure 6:
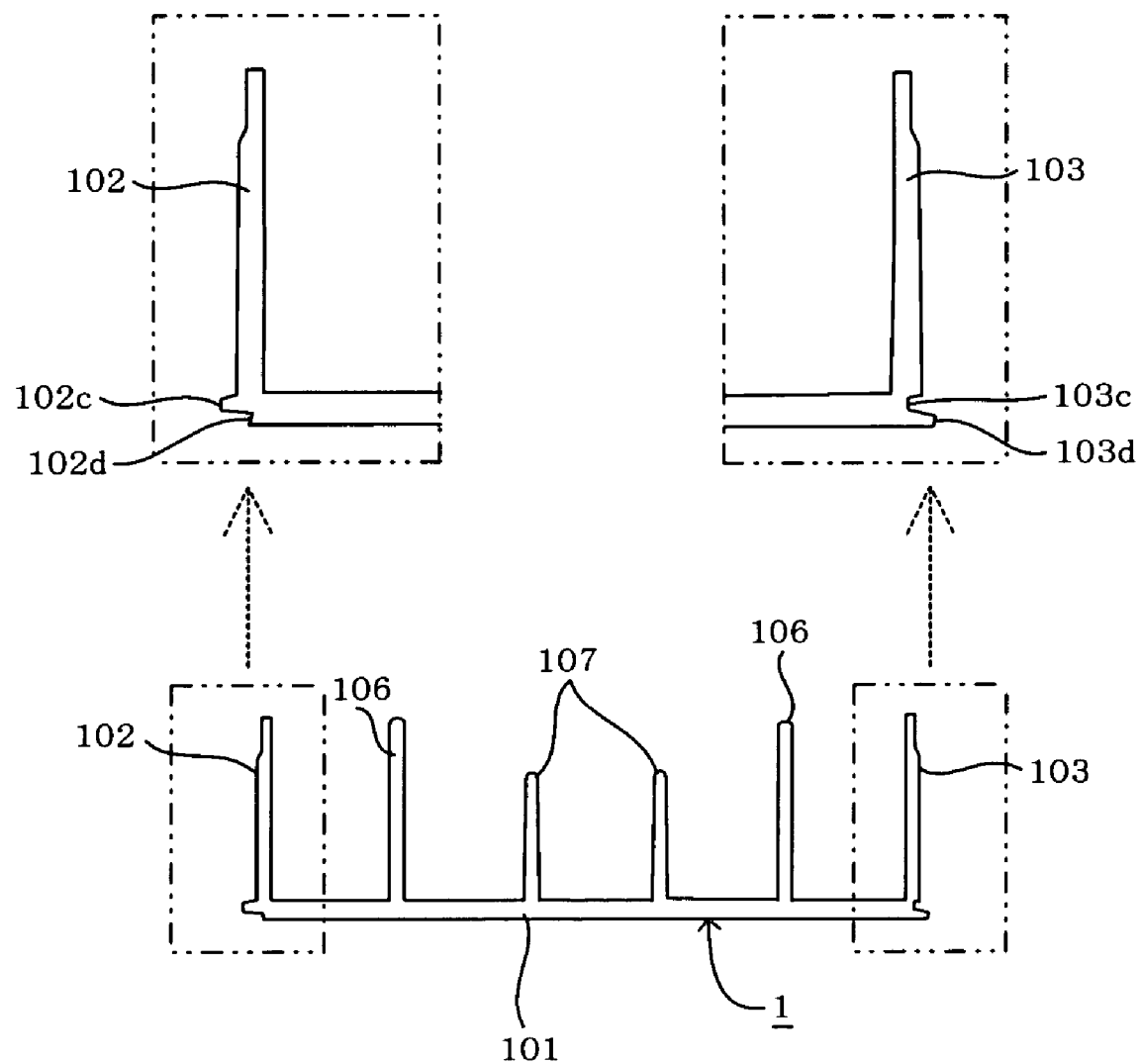
FIG. 6 is a partially enlarged cross-sectional view taken along the B-B line in FIG. 1.

FIG. 1 through FIG. 6 explain the structure of the segment 1 of the present embodiment. FIG. 1 is a top view of the entire segment 1. FIG. 2 is a side view viewed in the arrow C direction in FIG. 1. FIG. 3 is a cross-sectional view taken along the A-A line in FIG. 1. FIG. 4 is a bottom view of the segment 1. FIG. 5 is an auxiliary view viewed in the arrow D direction in FIG. 1. FIG. 6 is a partially enlarged cross-sectional view taken along the upper B-B line in FIG. 1.

The segment 1 comprises an inner plate 101, side plates 102 and 103, end plates 104 and 105, and respectively two each of reinforcing plates 106 and 107. The segment 1 is integrally formed from transparent, semitransparent, or opaque plastic. Vinyl chloride, ABS, DuraStar polymer (trade name), and the like are used as the transparent plastic. PVC, polyethylene, and the like are used as the semi-transparent plastic. PVC, polyester, ABS, polyethylene, polypropylene, and the like are used as the opaque plastic.

The inner plate 101 is formed as a plate having a prescribed width and is arcuately curved at a prescribed angle, e.g., 72°, and the bottom thereof forms the inner circumferential surface of the pipe unit 2, and hence forms the inner circumferential surface of the rehabilitating pipe. The arc circumferential direction of the inner plate 101 is the circumferential direction of the rehabilitating pipe, and its width direction lies in the longitudinal direction of the rehabilitating pipe. A rectangular opening 101a is formed respectively on each of both end parts of the inner plate 101.

These openings 101a are for the purpose of performing from the inside the work of tightening bolts 6 (refer to FIG. 8) for mutually coupling the segments 1 in the circumferential direction. After the tightening work is completed, a cover (not shown) is fixed to the opening 101a to thereby plug it.

Figure 9:
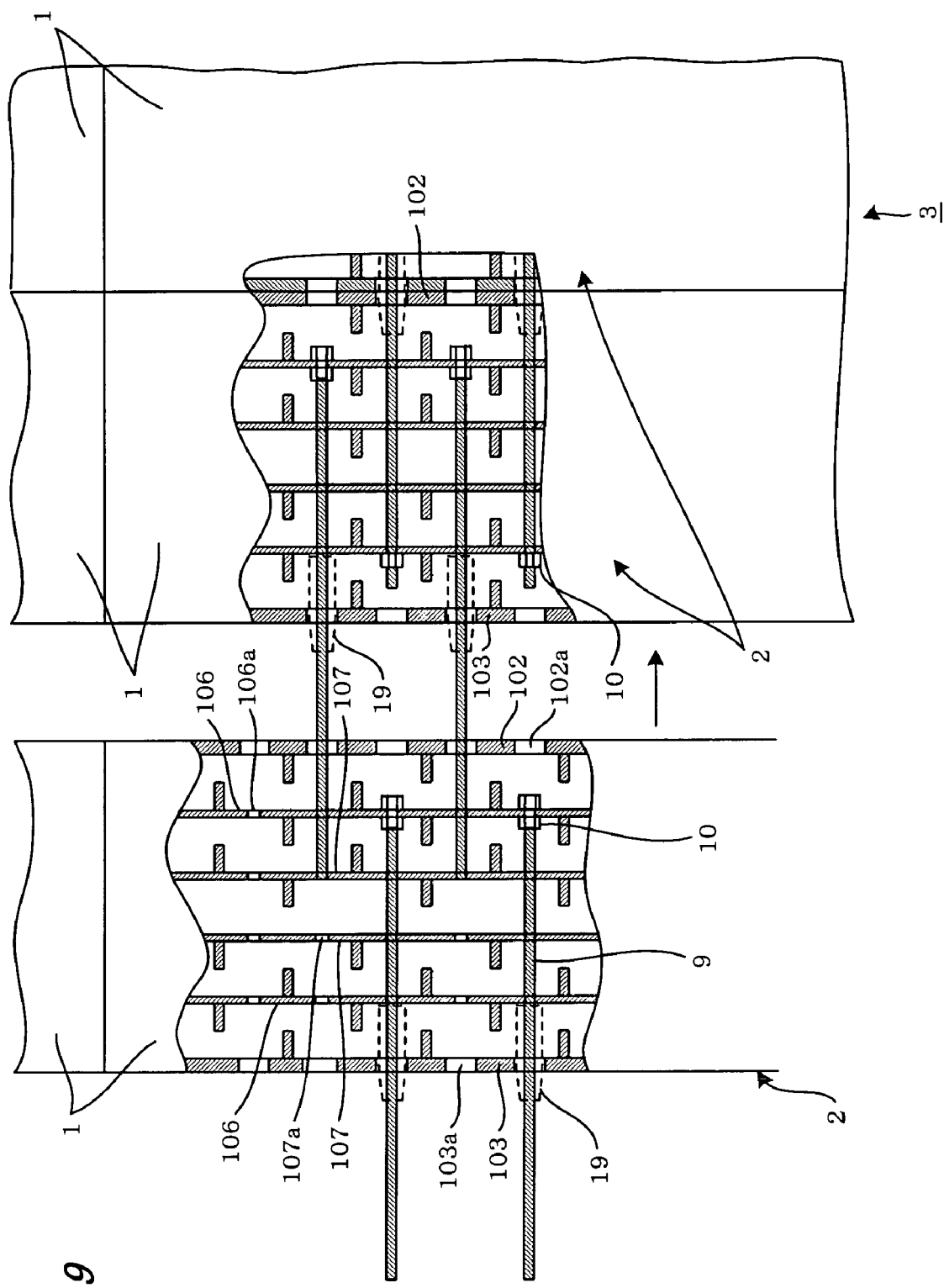
FIG. 9 is a partially broken cross-sectional view that explains how the pipe units are mutually coupled in the longitudinal direction.

The side plates 102 and 103 are formed respectively along the entire length of both side edges of the inner plate 101 and extend in the lengthwise direction of the inner plate 101, and are provided upright on the inner plate 101. In each of the side plates 102 and 103 are formed a plurality (herein, 14) of bolt through holes 102a and 103a at a prescribed interval in the circumferential direction for passing therethrough bolts 9 for mutually coupling the pipe units 2 in the longitudinal direction as shown in FIG. 9. The diameter thereof is slightly greater than the diameter of the head of the bolt 9 or of a nut 10 (refer to FIG. 9).

The outside surface of each of the side plates 102 and 103 forms the coupling surfaces when the segments 1 are mutually coupled in side-by-side relation in the longitudinal direction of the rehabilitating pipe 3. As shown in FIG. 6, a protruding part 102c, which protrudes from the outer surface, and a recessed part (groove) 102d, which is continuous therewith and recessed from the outer surface, are formed at the lower end part of the outside surface of the side plate 102. In addition, a recessed part 103c, which is recessed from the outer surface, and a protruding part 103d, which is continuous therewith and protrudes from the outer surface, are formed at the lower end part of the outside surface of the side plate 103. These are formed along the entire length of the side plates 102 and 103 along the side edge of the inner plate 101.

The protruding part 102c is tapered and has a cross-sectional shape along its direction of projection that is a horizontally oriented trapezoid, and is formed so that its vertical width decreases toward the tip side, with the upper surface and the lower surface inclined in the projection direction and the tip surface vertically planar. As shown in FIG. 6, the upper surface of the recessed part 102d is continuous with the lower surface of the protruding part 102c, and the back surface in the recessed direction is inclined so that it forms an acute angle with the upper surface of the recessed part 102d.

In addition, the recessed part 103c is tapered and shaped to conform to the protruding part 102c, i.e., having a shape capable of interfitting with tight (without any gap) surface contact, and the protruding part 103d is shaped to conform to the recessed part 102d. In addition, corresponding to the protruding part 102c and the recessed part 102d, the upper surface of the protruding part 103d along the protrusion direction is continuous with the lower surface of the recessed part 103c along the recessed direction.

The end plates 104 and 105 are formed at both end edges of the inner plate 101 along the entire length in the width direction thereof and extend in the widthwise direction of the inner plate 101, and are provided upright on the inner plate 101. A plurality of bolt through holes 104a and 105a for inserting therethrough the bolts 6 (refer to FIG. 8) that mutually couple the segments 1 in end-to-end relation in the circumferential direction are formed in the end plates 104 and 105.

In addition, the outside surfaces of the end plates 104 and 105 form the coupling surfaces when the segments 1 are mutually coupled in the circumferential direction. As shown in the cross-sectional view of FIG. 7, a recessed part (groove) 104c, which is recessed in a V shape from the outer surface, is formed at the center part of the vertical direction of the outside surface of the end plate 104, and a recessed part (groove) 104d, which is recessed from the outer surface, and a protruding part 104e, which protrudes from the outer surface, are formed vertically continuous at the lower end part thereof. In addition, a protruding part 105c that protrudes in a V shape from the outer surface is formed at the center part in the vertical direction of the outside surface of the end plate 105, and a protruding part 105d that protrudes from the outer surface and a recessed part 105e that is recessed from the outer surface are formed vertically continuous at the lower end part thereof. These are formed along the entire length of the end plates 104 and 105 in the width direction of the segment.

The shapes of the protruding part 105d and the recessed part 105e of the end plate 105 correspond to the protruding part 102c and the recessed part 102d of the side plate 102. Namely, the cross sectional shape of the protruding part 105d in the protrusion direction is a horizontally oriented trapezoid, whose upper surface and lower surface are formed inclined along the protrusion direction so that the vertical width decreases toward the tip side, and whose tip surface is formed vertically planar. In addition, the upper surface of the recessed part 105e along its recessed direction is continuous with the lower surface of the protruding part 105d, and the back surface in the recessed direction is inclined so that it forms an acute angle with the lower surface of the protruding part 105d.

In addition, a recessed part 104d of the end plate 104 is shaped to conform to the protruding part 105d, and the protruding part 104e is shaped to conform to the recessed part 105e. In addition, corresponding to the protruding part 105d and the recessed part 105e, the upper surface along the protrusion direction of the protruding part 104e is continuous with the lower surface along the recessed direction of the recessed part 104d. Furthermore, the shapes of the recessed part 104c and the protruding part 105c also conform.

The reinforcing plates 106 and 107 reinforce the mechanical strength of the entire segment 1, and are provided upright on top of the inner plate 101 (the outside surface of the arc) on the inside of the side plates 102 and 103. A plurality of bolt through holes 106a and notched parts 107a for inserting therethrough bolts 9 (refer to FIG. 9) for mutually coupling the pipe units 2, are formed in the reinforcing plates 106 and 107 at a position respectively corresponding to the bolt through holes 102a and 103a of the side plates 102 and 103. The diameter of each bolt through hole 106a is slightly greater than the diameter of a shaft part of the bolt 9, but slightly less than the diameter of the head of the bolt 9 or of the nut 10.

In addition, on the inside surfaces of the side plates 102 and 103 and both side surfaces of the reinforcing plates 106 and 107 (only one side surface of one of the reinforcing plates 107), a plurality of small right triangular protruding plates 102b, 103b, 106b, and 107b that project sideways to prevent deformation of the aforementioned surfaces alternate respectively at positions between adjoining bolt through holes 102a, 103a, 106a and notched parts 107a, and the bases of the aforementioned triangles are formed so that they are continuous with the inner plate 101 (refer to FIG. 5).

The pipe unit 2 is assembled by coupling the segments 1 in the circumferential direction, and a rehabilitating pipe 3 is assembled by coupling these pipe units 2 in the longitudinal direction. FIG. 7 through FIG. 10 explain the coupling method in that circumferential direction and that longitudinal direction.

Before coupling in the circumferential direction, the bolts 9 for coupling the pipe units 2 shown in FIG. 9 are first fixed to the segments 1. This fixing may be performed after coupling in the circumferential direction.

To fix each bolt 9, the bolt 9 is first inserted through the bolt through hole of one of the side plates 102 and 103 of the segments 1, e.g., the bolt through hole 102a of the side plate 102; then inserted through the bolt through holes 106a and the notched parts 107a of the reinforcing plates 106 and 107, and the bolt through holes 103a of the side plates 103, and inserted up to a position wherein the head of the bolt 9 contacts the reinforcing plate 106 on the side of the side plate 102, as shown in FIG. 9. Furthermore, a nut 10 is screwed to the tip side of the bolt 9 protruding outwards from the side plate 103, and tightened to a position wherein it contacts the reinforcing plate 106 on the side of the side plate 102; furthermore, the bolt 9 is fixed by inserting the cylindrical positioning member 19 from the tip side of the bolt 9 and inserting it to a position wherein it contacts the reinforcing plate 106 on the side of the side plate 103. The positioning member 19 positions the bolt 9 so that it is concentric with the bolt through hole 103a, and mutually aligns the positions of the bolt through holes 102a, 103a of the coupled pipe units 2, as discussed later.

Furthermore, the number of bolts 9 fixed is less than half the number of bolt through holes 102a, and the like, and one bolt 9 is fixed for every other or every two or more bolt through holes. In addition, the length of the part protruding from the side plate 103 of the fixed bolt 9 is set to the length of the bolt 9 so that it is slightly less than the width of the segment 1 (from the outer surface of the side plate 102 to the outer surface of the side plate 103).

Figure 7:
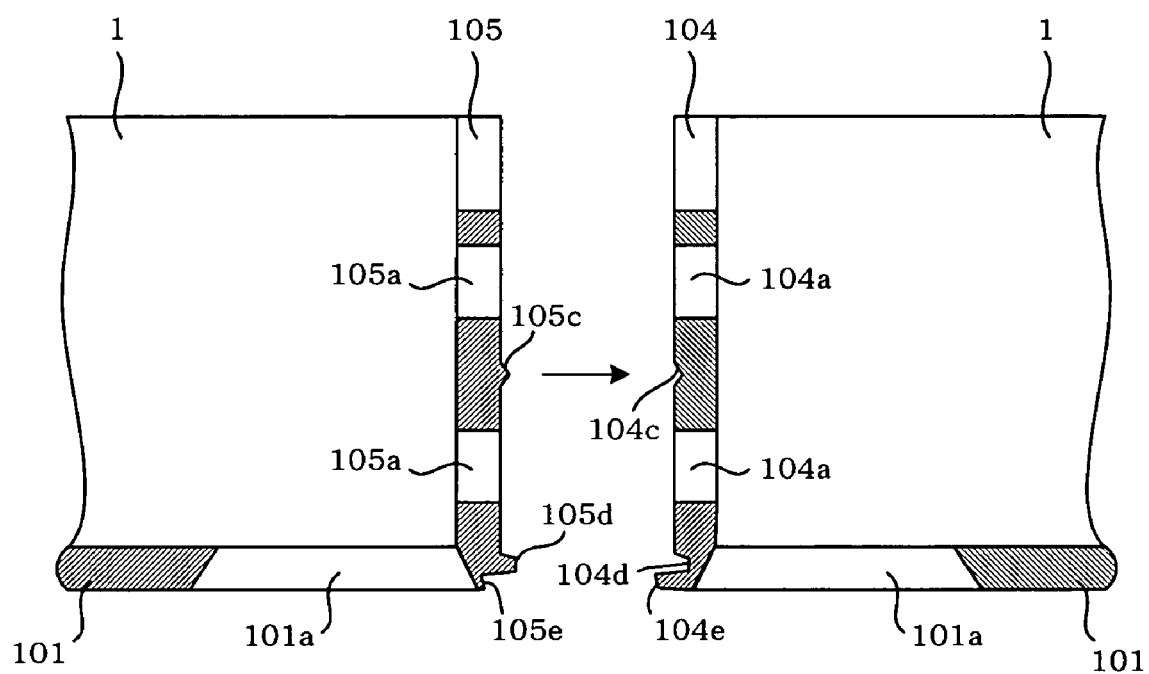
FIG. 7 is a longitudinal side view showing how the segments are mutually coupled in the circumferential direction.
Figure 8:
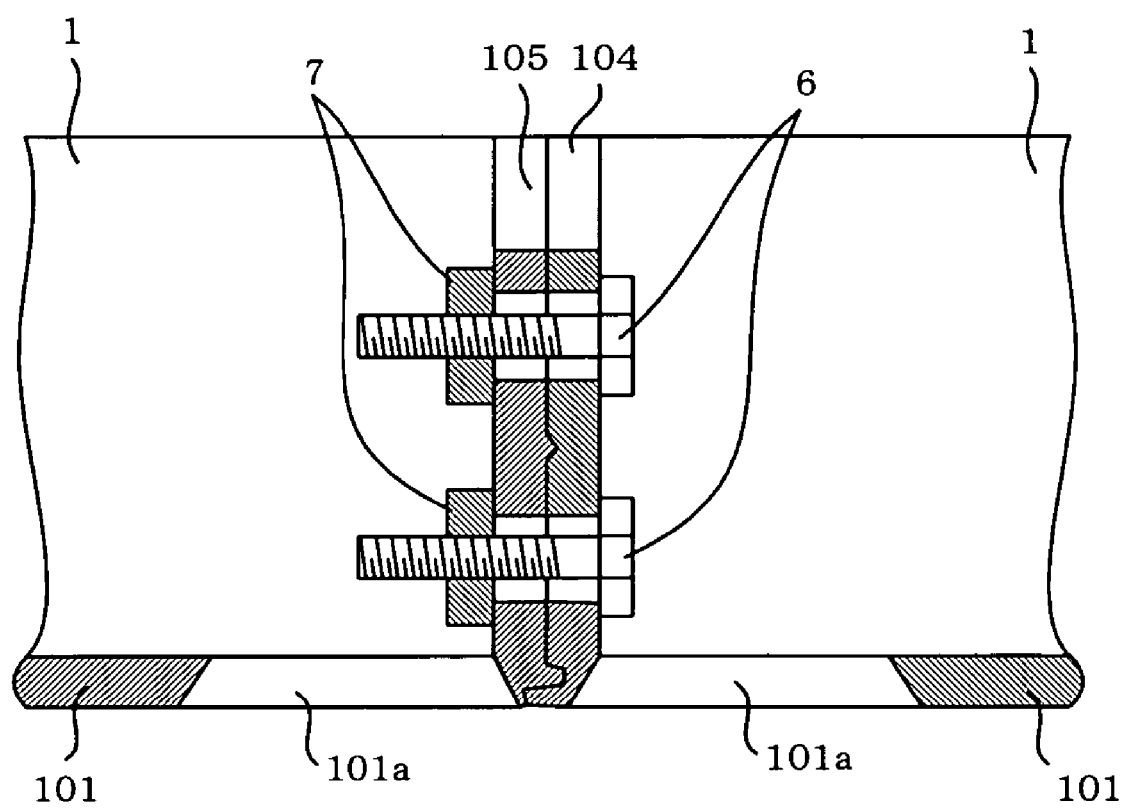
FIG. 8 is a longitudinal side view that depicts a state wherein the segments are mutually coupled in the circumferential direction.

Thus, after the bolts 9 are fixed to a plurality of segments 1, the segments 1 are mutually coupled in the circumferential direction, as shown in FIG. 7 through FIG. 8. Namely, the protruding parts 105c and 105d and the recessed part 105e of the end plate 105 of the segment 1 on the left side in FIG. 7 are first respectively interfitted with the recessed parts 104c and 104d and the protruding part 104e of the end plate 104 of the segment 1 on the right side, to mutually tightly seal the outside surfaces of the end plates 104 and 105. Furthermore, a sealing material (not shown) is coated beforehand on the inside surface of the recessed parts 104c, 104d and 105e.

Figure 12:
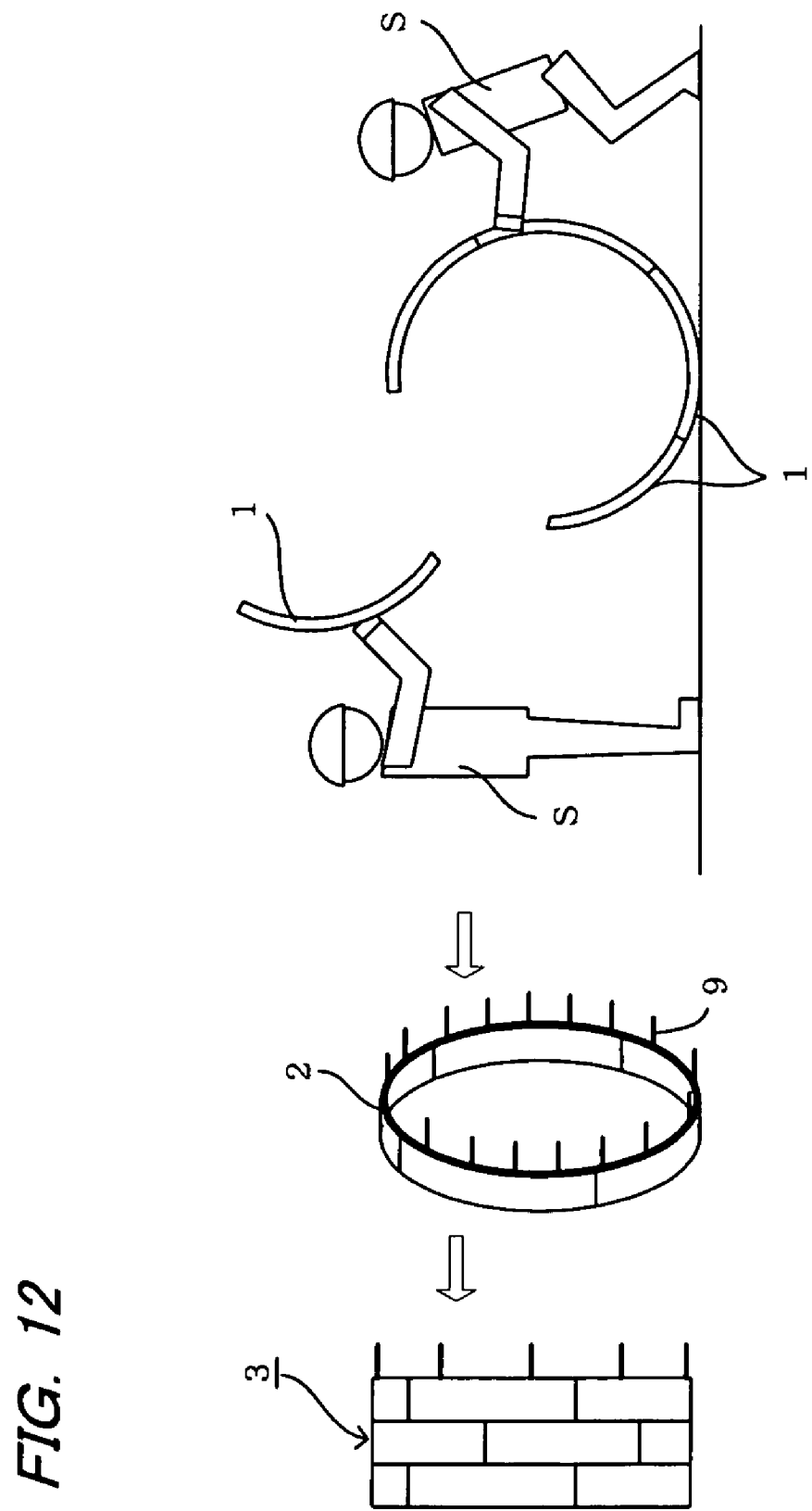
FIG. 12 is an illustrative view that depicts a process for assembling the rehabilitating pipe using segments.
Figure 13:
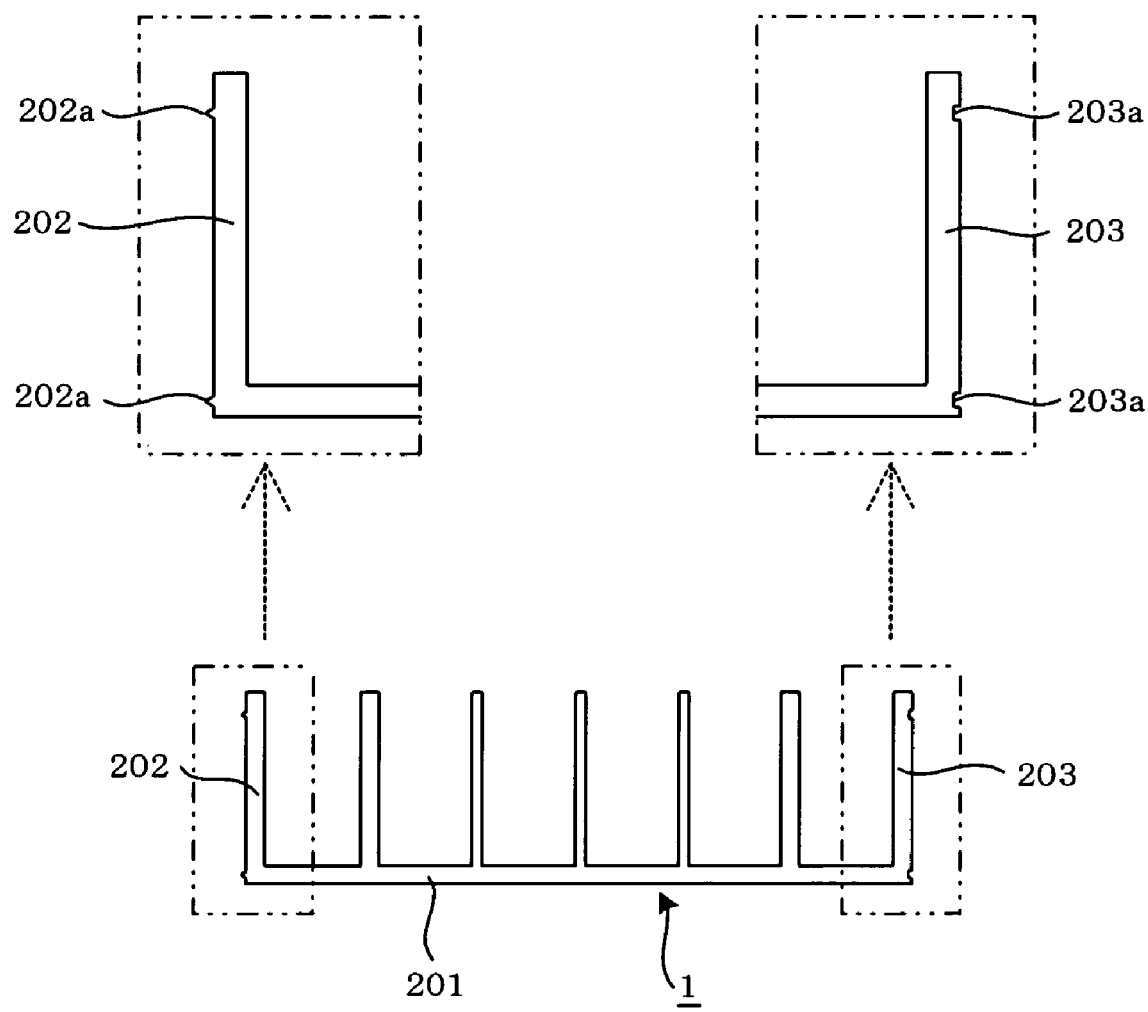
FIG. 13 is a partially enlarged cross-sectional view of a conventional segment.
Figure 14:
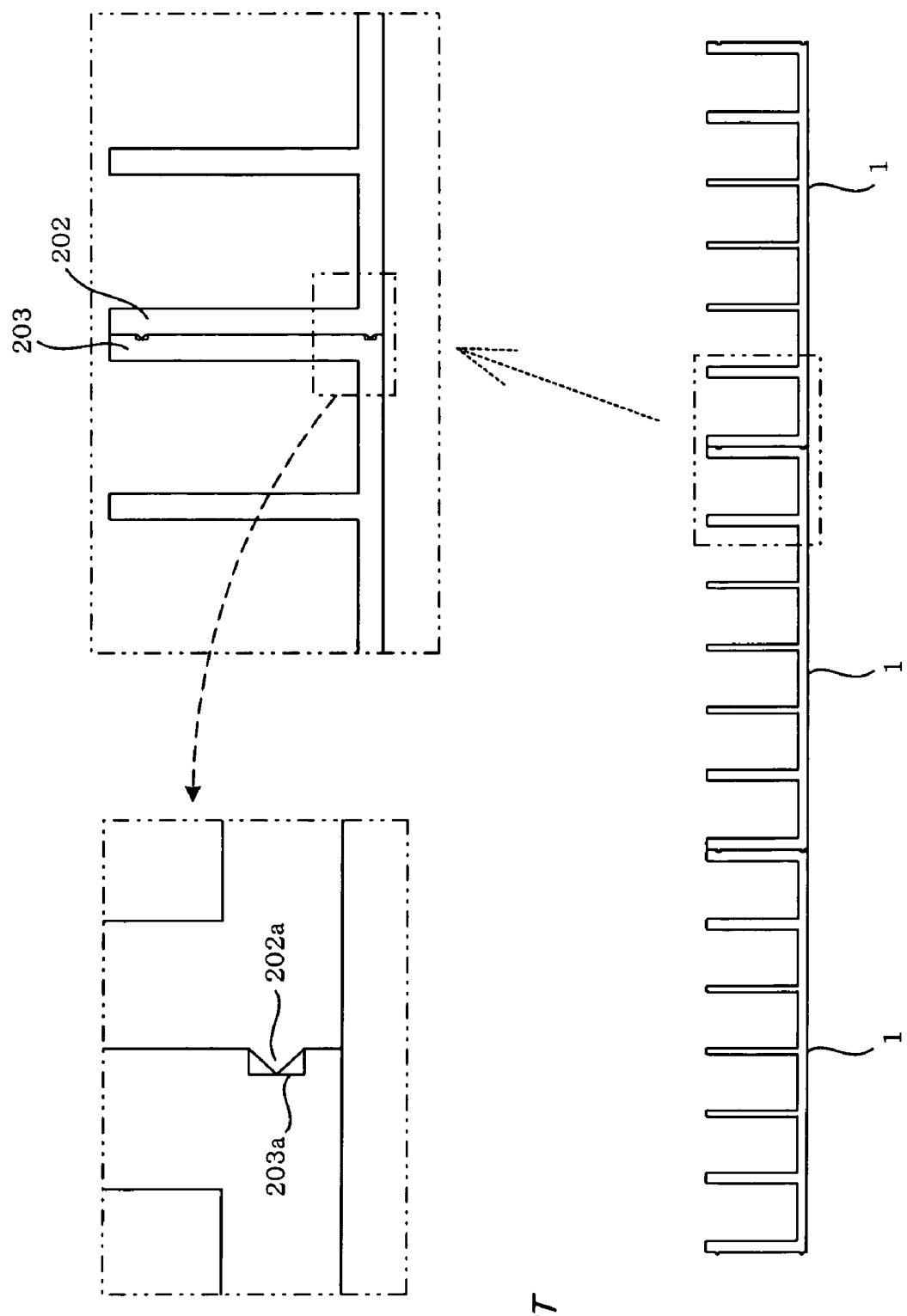
FIG. 14 is a partially enlarged cross-sectional view that depicts a state wherein conventional segments are coupled in the longitudinal direction.

Next, the segments 1, 1 are mutually coupled in the circumferential direction by introducing the bolts 6 as shown in FIG. 8 via the opening 101a of the inner plate 101 of the right side segment 1, and inserting them through the bolt through holes 104a and 105a of the end plates 104 and 105; introducing nuts 7 via the opening 101a of the segment 1 on the left side, screwing them to the bolts 6, and tightening them to the end plate 105. Thus, the pipe unit 2 is assembled as shown in FIG. 12 by successively coupling a plurality of segments 1 in the circumferential direction.

Figure 10:
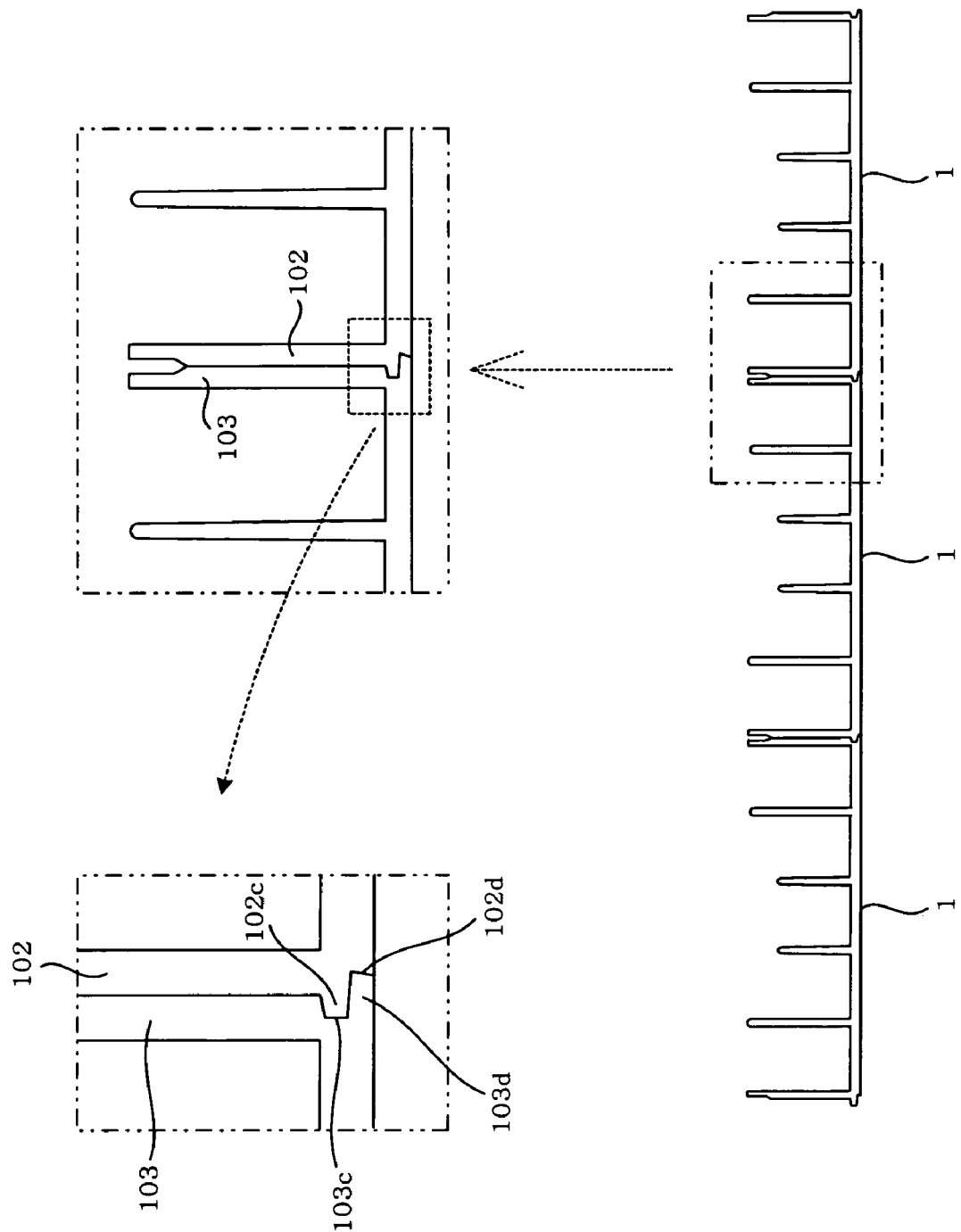
FIG. 10 is a partially enlarged cross-sectional view that depicts a state wherein the segments are mutually coupled in the longitudinal direction.
Figure 11:
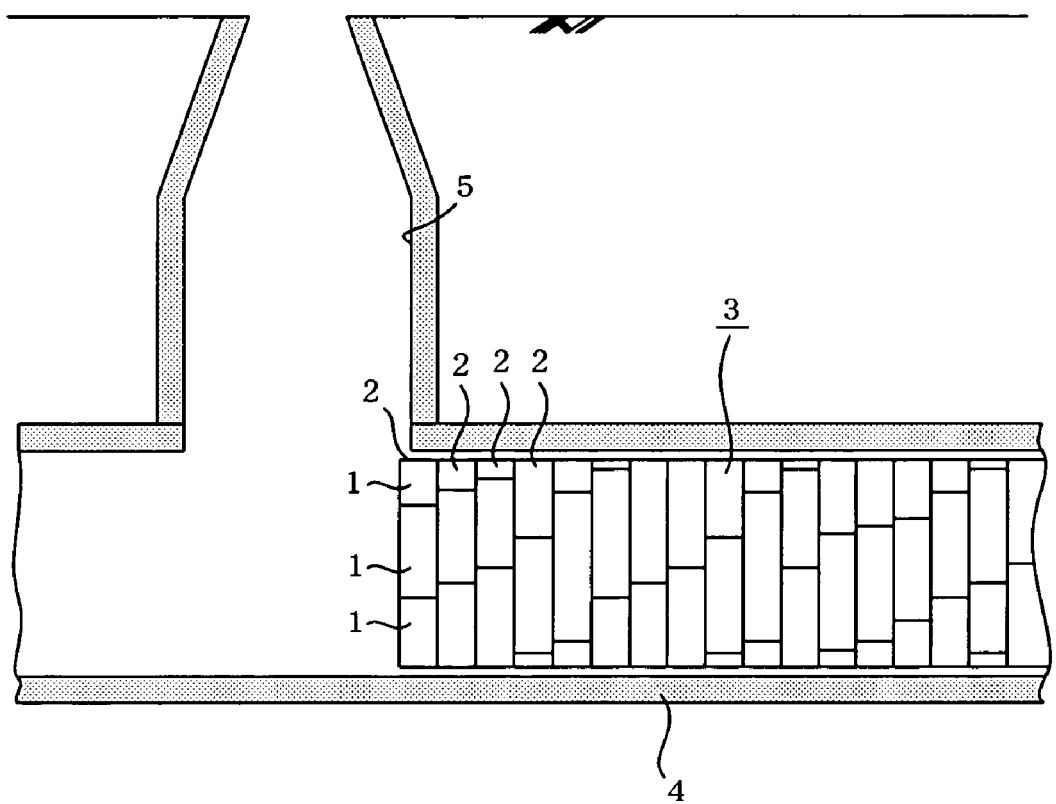
FIG. 11 is a cross-sectional view that depicts a rehabilitating pipe assembled inside the existing pipe.

Next, the mutual coupling of the pipe units 2 is performed as shown in FIG. 9 and FIG. 10. For example, to couple the pipe unit 2 on the left side in FIG. 9 to the pipe unit 2 on the right that is already assembled in the rehabilitating pipe 3, the bolts 9 protruding from the outer surface of the side plate 103 of each segment 1 of the pipe unit 2 on the right side are first inserted through the bolt through holes 102a, 106a and the notched parts 107a of the side plates 102 and the reinforcing plates 106, 107 of the part wherein the bolts 9 of the segments 1 of the pipe unit 2 on the left side are not fixed. The positioning members 19 are then inserted into the bolt through holes 102a of the side plate 102.

The outer surfaces of the side plates 102 of the segments 1 of the pipe unit 2 on the left side are pressed against the outer surfaces of the side plates 103 of the segments 1 of the pipe unit 2 on the right side. At this time, the protruding part 102c and the recessed part 102d of the side plates 102 are interfitted with the recessed part 103c and the protruding part 103d of the side plates 103 as shown in FIG. 10, and the outer surfaces of the side plates 102 and 103 are thereby mutually, tightly sealed. In this case, the inner surfaces of the recessed parts 102d and 103c are coated beforehand with a sealing material (not shown). Herein, the tip parts of the bolts 9 protruding from the segments 1 of the pipe unit 2 on the right side of FIG. 9 reach the vicinity of the inside of the side plates 103 of the segments 1 of the pipe unit 2 on the left side, so that the pipe unit 2 on the left side is fixed and coupled to the pipe unit 2 on the right side by screwing the nuts 10 from the bolt through holes 103a onto the tip parts of the bolts 9 and tightening to the reinforcing plates 106 adjacent to the side plates 103.

To mutually couple segments 1 in the longitudinal direction to assemble the rehabilitating pipe, the shapes of the protruding part 102c and the recessed part 103c conform and the shapes of the recessed part 102d and the protruding part 103d also conform so that they can be brought into tight surface contact (without any gap) and interfitted with each other. Moreover, the protruding part 102c and the recessed part 102d as well as the recessed part 103c and the protruding part 103d are continuous, and their jointly fitted shapes are intricate; therefore, the surface contact area increases locally, thereby enabling the joint to be strengthened. Accordingly, the watertightness of the coupling part in the longitudinal direction is improved, and a sufficient watertightness can be ensured.

Furthermore, when coupling in the longitudinal direction, the force of tightening the bolts 9 is applied to the protruding part 103d downward from the inclined lower surface of the protruding part 102c, but breakage of the protruding part 103d can be prevented because of the offsetting force applied upward from the inclined back surface of the recessed part 102d.

In addition, the coupling in the circumferential direction is also the same; as shown in FIG. 7 through FIG. 8, the mutually interfitting shapes conform when interfitting the protruding parts 105c, 105d and the recessed part 105e of the end plate 105 to the recessed parts 104c, 104d and the protruding part 104e of the end plate 104, respectively, and can therefore be brought into tight surface contact and interfitted therewith. Moreover, the surface contact area locally increases at the part of the protruding part 105d and the recessed part 105e as well as the recessed part 104d and the protruding part 104e, thus enabling the strengthening of the joint. Accordingly, the watertightness of the coupling part in the circumferential direction is also improved, and a sufficient watertightness can be ensured. Furthermore, breakage of the protruding part 104e can likewise be prevented.

In the above mentioned embodiment, the side of each of the protruding parts 102c, 103d, 104e and 105d as well as the recessed parts 102d, 103c, 104d and 105e are made planar, and have an overall angular shape; however, it is also acceptable that at least some of the sides have a curved and rounded shape.

In addition, although the protruding part 102c or 105d formed in the side plate 102 or the end plate 105 in the embodiment is formed so that the vertical width decreases towards the tip side of the protruding part, the upper surface and/or the lower surface of the protruding part along the protrusion direction can also respectively be made horizontal surfaces, and the recessed parts 103c and 104d that interfit with these protruding parts 102c and 105d can also be formed as recessed parts having surfaces that make tight surface contact therewith.

In addition, although the upper surface of the protruding part 103d or 104e formed in the side plate 103 or the end plate 104 is downwardly inclined toward the tip side of the protruding part, and the tip surface of the protruding part is inclined with respect to the vertical direction, these upper surfaces and/or tip surfaces can be made horizontal or vertical surfaces. In this case, the recessed parts 102d and 105e that interfit with these protruding parts 103d and 104e can also be formed as recessed parts having a surface that makes tight surface contact therewith.

In addition, the protruding parts 102c and 103d formed in the side plates 102 and 103, the recessed parts 103c and 102d that interfit with these protruding parts, the protruding parts 104e and 105d formed in the end plates 104, 105, and the recessed parts 105e and 104d that interfit with these protruding parts are respectively formed at the lower part of the segments, but may also be formed elsewhere, e.g., the center part.

What is claimed is:

1. A segment for a rehabilitating pipe that can be coupled to another similar segment in the longitudinal direction of a rehabilitating pipe to rehabilitate an existing pipe, the segment comprising: an inner plate having opposite ends spaced apart from one another in a circumferential direction and opposite sides spaced apart from one another in the longitudinal direction, and two side plates extending upright from respective sides of the inner plate, each side plate having an outer surface that forms a coupling surface, one coupling surface having in the longitudinal direction a protruding part and a recessed part continuous with the protruding part and the other coupling surface having in the longitudinal direction a recessed part and a protruding part whose shapes respectively conform to the shapes of the protruding part and the recessed part of the one coupling surface so that the protruding part and the recessed part of the one coupling surface can be brought into tight surface contact with a recessed part and a protruding part of another coupling surface of another similar segment and interfitted thereto when the one and another segments are mutually coupled in the longitudinal direction of the rehabilitating pipe.

2. A segment for a rehabilitating pipe according to claim 1; further including two end plates extending upright from respective ends of the inner plate, each end plate having an outer surface that forms a coupling surface, and wherein one coupling surface of one end plate has in the circumferential direction a protruding part and a recessed part continuous with the protruding part and the other coupling surface of the other end plate has in the circumferential direction a recessed part and a protruding part whose shapes respectively conform to the shapes of the protruding part and the, recessed part on the one coupling surface in the circumferential direction so that the protruding part and the recessed part of the one coupling surface of the one end plate can be brought into tight surface contact with a recessed part and a protruding part of another coupling surface of an end plate of another similar segment and interfitted thereto when the one and another segments are mutually coupled in the circumferential direction of the rehabilitating pipe.

3. A segment for a rehabilitating pipe according to claim 2; wherein on each coupling surface of each end plate, one surface of the recessed part is continuous with one surface of the protruding part.

4. A segment for a rehabilitating pipe according to claim 3; wherein the protruding part of the one coupling surface of the one end plate is inclined in the protrusion direction so that the width of the cross-sectional shape along the protrusion direction decreases toward the tip side, and the recessed part of the coupling surface is inclined so that the back surface in the recessed direction forms an acute angle with the one surface of the recessed part continuous with said one surface of the protruding part.

5. A segment for a rehabilitating pipe according to claim 1; wherein on each coupling surface, one surface of the recessed part is continuous with one surface of the protruding part.

6. A segment for a rehabilitating pipe according to claim 5; wherein the protruding part of the one coupling surface is inclined in the protrusion direction so that the width of the cross-sectional shape along the protrusion direction decreases toward the tip side, and the recessed part of the coupling surface is inclined so that the back surface in the recessed direction forms an acute angle with the one surface of the recessed part continuous with the one surface of the protruding part.

7. A segment connectable to other similar segments to form a rehabilitating pipe for rehabilitating an existing pipe, the segment comprising: an arcuate inner plate having opposite ends spaced apart from one another in a lengthwise direction of the inner plate and opposite sides spaced apart from one another in a widthwise direction of the inner plate, the inner plate having an arcuate shape along the lengthwise direction thereof; and two side plates extending upright from the inner plate in the lengthwise direction thereof at respective sides of the inner plate, one side plate having on an outer surface thereof a coupling portion that extends lengthwise along the one side plate and that comprises a protruding part and a recessed part, the other side plate having on an outer surface thereof a coupling portion that extends lengthwise along the other side plate and that comprises a recessed part and a protruding part whose shapes complement the shapes of the protruding part and the recessed part, respectively, on the other side plate so that the segment can be connected in side-by-side relation to another similar segment by engaging a coupling portion of the segment with a complementary coupling portion of the other similar segment.

8. A segment according to claim 7; further including two end plates extending upright from the inner plate in the widthwise direction thereof at respective ends of the inner plate, one end plate having on an outer surface thereof a coupling portion that extends widthwise along the one end plate and that comprises a protruding part and a recessed part, and the other end plate having on an outer surface thereof a coupling portion that extends widthwise along the other end plate and that comprises a recessed part and a protruding part whose shapes complement the shapes of the protruding part and the recessed part, respectively, on the one end plate so that the segment can be connected in end-to-end relation to another similar segment by engaging a coupling portion on an end plate of the segment with a complementary coupling portion of an end plate of the other similar segment.

9. A segment according to claim 8; wherein the protruding parts and the recessed parts are tapered.

10. A segment according to claim 8; wherein one of the two end plates has on the outer surface thereof a V-shaped projection, and the other of the two end plates has on the outer surface thereof a complementary V-shaped recess.

11. A segment according to claim 7; wherein the protruding parts and the recessed parts are tapered.

* * * * *